United States Patent Office 3,350,973
Patented Nov. 7, 1967

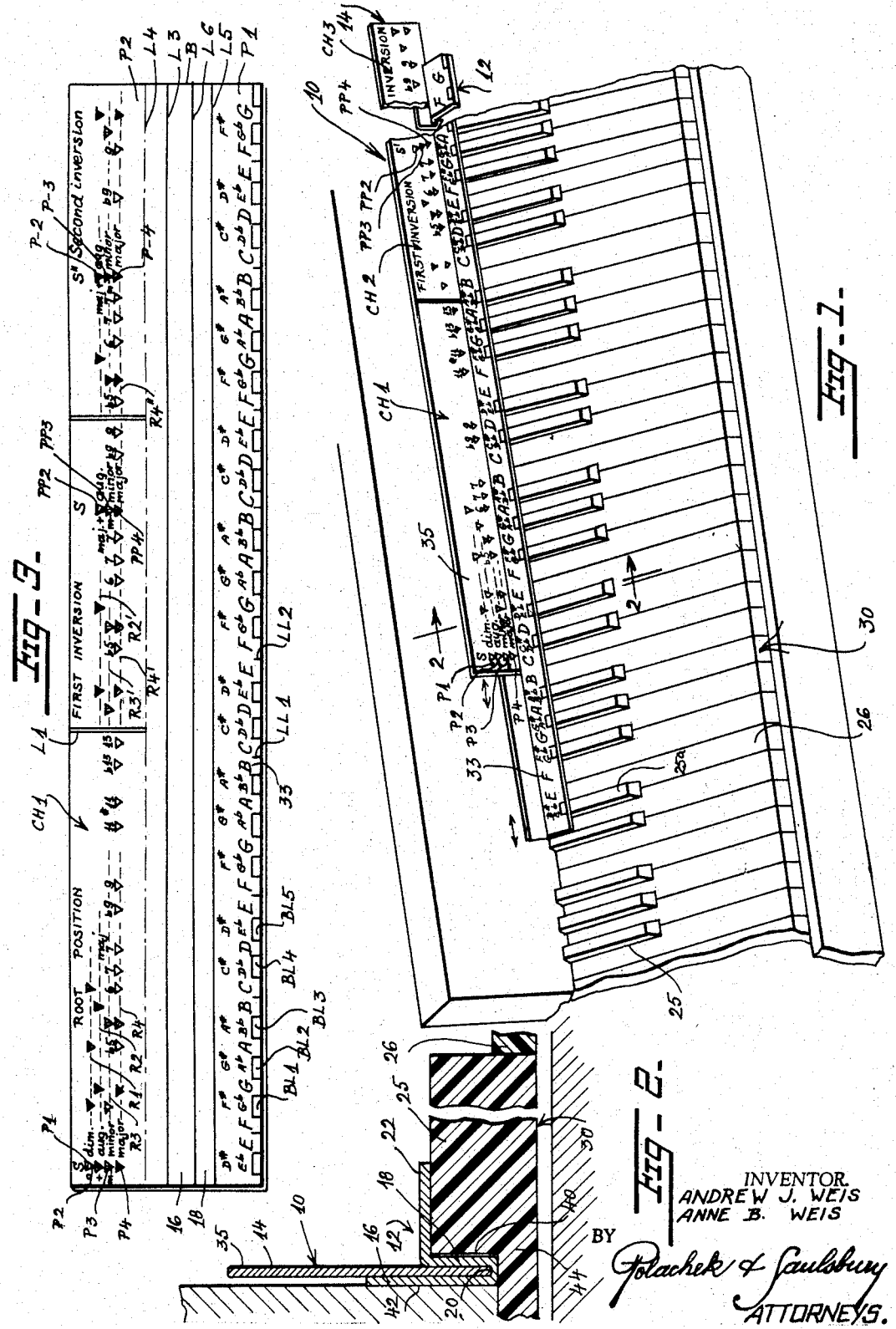

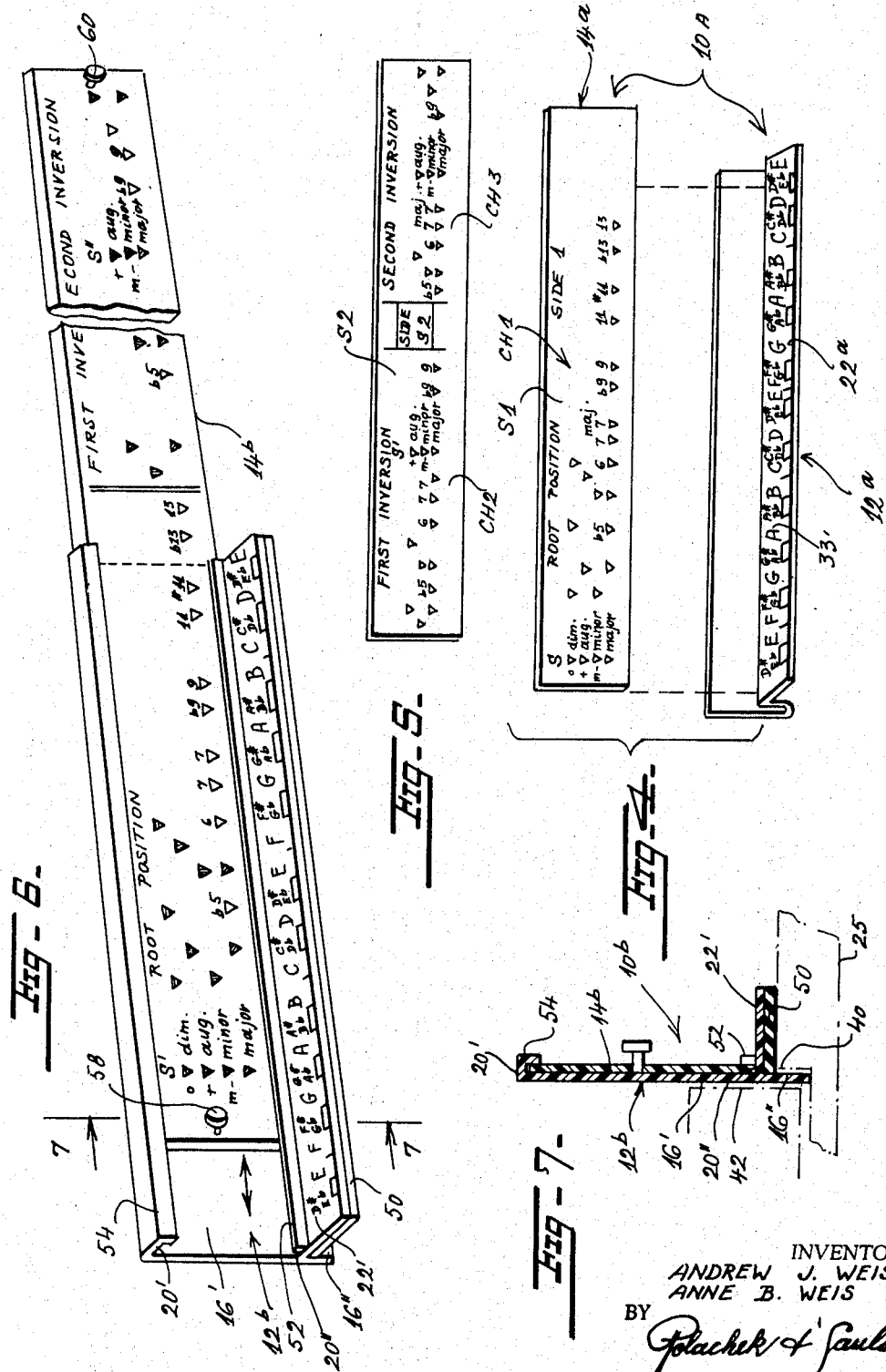

3,350,973
MUSIC CHORD FINDER DEVICE
Andrew J. Weis and Anne B. Weis, both of 137
Summit Ave., Mount Vernon, N.Y. 10550
Filed Feb. 5, 1965, Ser. No. 430,587
1 Claim. (Cl. 84—478)

ABSTRACT OF THE DISCLOSURE

The disclosure describes a music chord finder device for a keyboard instrument. It includes an elongated base member made of a sheet folded to define an open top groove between two walls. The fold of the sheet fits between a vertical panel slightly spaced from abutments at the rear ends of keys of the instrument. A lip extends forwardly from one of the two walls to overlay rear ends of the keys. A slide plate is movably disposable in the groove. On the front wall of the device and on the slide plate are keys. The lip is divided into areas corresponding to the keys with chord designations on the lip. Upper portions of the slide plate have rows of colored pointers indicating locations of chords and different inversions of chords.

---

This invention concerns a music chord finder, and is an improvement over that described in my prior Patent 3,101,023.

The present invention is directed at a simplified chord finder adapted to be mounted on the keyboard of a piano or other keyboard instrument, without in any way interfering with playing of the keys of the instrument. The chord finder in one form thereof includes a base part made out of a strip of paper or plastic material folded to form a groove and laterally extending lip.

The grooved portion fits behind the black keys of the instrument. The lip is divided into chromatic note divisions which are to be placed in registration with corresponding keys of the instrument. A paper or plastic slide can be fitted into the grooved portion and is movable horizontally therealong in a vertical position. On the slide are inscribed groups of musical chord indications in several horizontal rows. By properly locating indices on the slide with respect to selected note divisions of the lip of the base part, certain chord indications are located on the slide. These chord indications positively identify the notes of any desired chord in any key. The device may be used to identify major, minor, augmented and diminished chords. Chords in root position, first and second inversions are obtainable. Sixth, seventh, ninth, eleventh and thirteenth chords are obtainable. In order to facilitate location of notes in a chord, the appropriate note indications can be colored. For example, green, red, orange and blue indications may represent notes of major, minor, augmented and diminished chords respectively. The root chord indications can be placed on one side of the slide and the first and second chord inversions can be placed on the other side; or the root, first inversion and second inversion chord indications can all be placed on the same side of the slide. The base part of the device may be two, three, four or more octaves in length.

It is therefore a principal object of the invention to provide a music chord indicator device of simplified structure including a single base part and a single slide, the base part fitting on a keyboard of an instrument and the slide moving longitudinally in the base part.

A further object is to provide a device as described, wherein the base part has a grooved portion to receive the slide, the grooved portion being narrow enough to fit behind the keys of a keyboard, with a lip extending laterally from the grooved portion to overlay the keys, the lip being divided into chromatic note or key divisions.

Another object is to provide a music chord indicator having a base with a narrow portion adapted to fit behind the keys or a keyboard with an internally extending lip to overlay the keys, the lip being divided into successive chromatic note or key positions, and with a slotted portion to receive a slide.

Still another object is to provide a music chord indicating device having a base part which fits over keys of a keyboard and carries chromatic note designations, and having a slide which is held slidably in the base part, the slide carrying indicia for instantly locating keys of selected chords.

A still further object is to provide a music chord indicating device as described, wherein the indications for locating notes or keys of root, first inversion and second inversion chords are placed either on one side of the slide or on both sides of the slide.

For further comprehension of the invention, and of the objects and advantages thereof, reference will be had to the following description and accompanying drawings and to the appended claim in which the various novel features of the invention are more particularly set forth.

In the accompanying drawings forming a material part of this disclosure:

FIG. 1 is a perspective view of part of a piano keyboard with a music chord locating device embodying the invention shown mounted thereon, parts of the device being broken away.

FIG. 2 is a fragmentary enlarged sectional view taken on line 2—2 of FIG. 1.

FIG. 3 is an oblique view of a blank from which the device can be assembled.

FIG. 4 is an exploded perspective view of base and slide parts of another device embodying the invention.

FIG. 5 is an oblique view of the reverse side of the slide of FIG. 4.

FIG. 6 is a perspective view of a further device embodying the invention, parts being broken away.

FIG. 7 is an enlarged sectional view taken on line 7—7 of FIG. 6.

Referring first to FIGS. 1 and 2, there is shown chord finder 10 including a base part 12 and a slide or slide plate 14. The base part has a wider rear vertical wall 16 bent up parallel to a forward narrower wall 18 to define a narrow groove 20 with open top therebetween. A flat lip or ledge 22 extends laterally from the upper edge of wall 18 and overlays the rear ends of exposed parts of both black keys 25 and white keys 26 of keyboard 30. The lip 22 rests on the upper surface of the black keys 25. The base part 12 is clear of the keys when the keys are depressed so that the base part 12 does not interfere with playing of the keys in any way. Keyboard 30 can be a practice keyboard or may be part of a piano, accordion or other keyboard instrument.

The upper horizontal surface of the lip 22 is divided into divisions corresponding in width and location to the keys 25, 26. The divisions carry lettered designations 33 representing successively a plurality of octaves of chromatic notes of tempered musical scales. The first lettered division D♯ or E♭ (E flat) is shown in FIG. 1 lined up with black key 25a which is a D♯ or E♭ key of the keyboard.

Disposed in a vertical plane and slidable horizontally in groove 20 is slide 14. This slide is a long, flat, rectangular plate which has its lower edge engaged in groove 20 and which extends upwardly beyond the flat horizontal lip 22, so it can be easily grasped for removing it from groove 20 and replacing it in the groove through the open top thereof. On the exposed forward side of 35 of the slide are three sections designated CH1, CH2, and CH3, and representing root position, first inversion and second inversion of chords to be located by means of the device.

FIG. 3 shows a blank B from which the parts of the device can be made. This blank is a flat rectangular strip made of paper, cardboard, plastic or metal sheet material. The lower marginal part P1 of the blank is divided into lettered divisions 33 representing the successive chromatic keys of keyboard 30. The upper marginal part P2 of the blank is divided by lines L1, L2 into three parts or sections CH1, CH2, CH3. Slide 14 can be made from blank B by cutting the blank longitudinally along horizontal line L3. The lower marginal part of the slide between dotted line L4 and line L3 will be clear and will fit into groove 20 of the base part 12.

Base part 12 is made by folding the lower cut part of the blank B on line L5 to define lip 22 and depending wall 18. Then the adjacent part of the blank is folded on line L6 to define groove 20. The upper edge of wall 16 is formed by the cut on line L3. Rear wall 16 will be folded up parallel front wall 18.

In the first or left section CH1 of slide 14 are chord indications representing root positions of chords. In the second or intermediate section CH2 chord indications represent first inversions of chords and in the third or right section CH3 chord indications represent second inversions.

It will be noted that in the first section, there are four horizontal rows R1, R2, R3 and R4 of triangular pointers P1, P2, P3 and P4 respectively. These rows represent respectively from the top down diminished chords designated "o" or "dim."; augmented chords designated "+" or "aug."; minor chords designated "m" or "−"; and major chords designated "MAJOR." It is desirable that the triangular pointers P1–P4 be colored differently for easy recognition. Suggested colors are blue for notes in diminished chords of uppermost row R1, orange for notes in augmented chords in next lower row R2, red for notes of minor chords in next lower row R3 and green for notes of major chords in lowermost row R4. Additional triangular pointers which may be uncolored are provided in row R4 and are designated "d5," (read flatted fifth), "6," "7," "MAJ. 7," "d9," (flatted ninth), "9," "11," "d11," (flatted eleventh), "d13" and "13." The spacing of these pointers is such as to correspond to locations of notes in various chords as is explained below. Under the note selector S in rows R1–R4 respectively of the first section CH1 appear four index pointers P1′, P2′, P3′ and P4′.

In the second section CH2, there are three rows R2′, R3′ and R4′ for locating the first inversion of augmented, minor and major chords respectively. Under note selector S′ appear three triangular index pointers PP2, PP3, PP4. In the three rows R2′, R3′, R4′ are similar triangular pointers which are preferably colored orange, red and green respectively. Additional uncolored pointers on row R4′ are designated respectively "d5," "6," "7," "MAJ. 7," "d9," "9."

In the third chord section CH3 are three rows R2″, R3″, and R4″ for locating second inversions of augmented minor and major chords respectively. Under note selector designation S″ are three triangular index pointers P-2, P-3, P-4. In the three rows are similar triangular pointers preferably colored orange, red and green respectively. Additional uncolored pointers on row R4″ are designated "d5," "6," "7," "MAJ. 7," "d9," "9." It will be noted that the pointers under the note selector S″ are further to the left in section CH3 than the note selector S′ in second section CH2. Selector S′ is further to the right in second section CH2 than not selector S which is at the extreme left in first section CH1.

In use of the chord finder 10, it is mounted on the keyboard as shown in FIGS. 1 and 2. The base is placed in a stabilized position on the keys. A certain amount of flexibility in the material of the base member causes the walls 16 and 18 to separate slightly so that wall 18 presses lightly against the rear abutments 40 of black keys while rear wall 16 presses against back wall or panel 42 of the keyboard. The bight 44 at the folded lower edges of walls 16, 18 may rest on the white keys and rear portions of the black keys so that when any keys are pressed the remaining keys support the base. The lip 22 rests lightly on the upper surfaces of the black keys because the width of front wall 18 is substantially equal to the depth of abutments 40. The base 12 should be placed on the keyboard so that the lettered designations 33 on lip are aligned with corresponding keys on the keyboard. To facilitate this the lip is divided into groups of three blocks BL1, BL2, and BL3 alternating with groups of two blocks BL4, BL5. Blocks BL1, BL2 and BL3 are located respectively at F♯, G♯ and A♯ designations or G♭, A♭, B♭. Blocks BL4, BL5 are located at C♯ and D♯ note designations or D♭ and E♭. Note designations B, C and E, F are separated by short index lines LL1 and LL2. The base 12 is placed so that the blocks BL1–BL5 line up with the corresponding black keys anywhere along the keyboard where the chords are to be located, preferably about the middle of the keyboard.

Then the slide 14 is inserted in groove 20 as shown in FIGS. 1 and 2 with the several chord locating sections visible above the keys 25, 26 and lip 22. Some chords will be found only on white keys; some chords are found only on black keys, and some are found on both white and black keys as will now be explained.

*Elementary chords in root position*

Slide 14 shown in FIG. 1 is located so that pointers P1–P4 under note selector S line up with a C on lip 22 and with a corresponding C key on the keyboard.

C (major) chord is indicated by three green pointers in row R4 at C, E and G.

Cm (minor) chord is indicated by the three red pointers in row R3 at C, E♭, G.

C aug. (augmented) chord is indicated by the three orange pointers in row R2 at C, E, G♯.

F dim. (diminished) chord is indicated by the three blue pointers in row R1 at C, E♭, G♭.

All other chords in the root position section CH1 are located by moving the slider 14 to line up the pointers P1–P4 under note selector S to the key whose major, minor, augmented or diminished chords are desired.

*Advanced chords in root position*

Advanced or enlarged chords are elementary chords with additional notes or keys, i.e. four or more notes or keys. The additional notes or keys are indicated by the numbered pointers "6," "7," "9," etc. in row R4. These pointers are preferably uncolored, or may have a color different from any of the colors of the other pointers. The pointer numbers indicate which notes or keys to add to the elementary chords. For example the C7 chord is a C major chord (triad) with a 7th note added. The C7 chord as shown in FIG. 1 is C, E, G, B♭. The following table lists the key pointers added to the fundamental triad of any elementary chord in enlarging the elementary chord.

| Chord: | Key pointer |
|---|---|
| d5th | d5. |
| 6th | 6. |
| 7th | 7. |
| major 7th | MAJ. 7. |
| 9th | 7, 9. |
| d9th | 7, d9. |
| 11th | 7, 9, 11. |
| ♯11th | 7, 9, ♯11. |
| 13th | 7, 9, 11, 13. |
| d13th | 7, 9, 11, d13. |

When finding the d5th (flatted fifth) the colored pointer to the right of the d5th is omitted from the chord. Ninth chords are usually accompanied by a 7th. Eleventh chords are usually accompanied by a 7th and 9th. Thirteenth chords are usually accompanied by a 7th, 9th and 11th.

First inversions of chords

First inversions are located by means of section CH1 of the chord finder slide 14. To locate a major chord in the first inversion, the slide 14 is moved until the note selector S' is located at the desired key. In FIG. 1, the note selector S' is located at G♯ or (A flat) on lip 22 and keyboard 30. The three green pointers PP4 at C, D♯ and G♯ in row R4' locate the first inversion of G♯ major. The first inversion of G♯ minor chord has red pointers PP3 at B, D♯ and G♯ in row R3'. The first inversion of augmented G♯ chord is located by the orange pointers PP2 in row R3' at C, E, G♯. Enlargements of the chords in the first inversion are determined by adding the notes or keys pointed out by the 6th, 7th, MAJ. 7th, d9th and 9th pointers as explained in connection with the chords in the root position.

Second chord inversions

Second chord inversions are located in the same manner as described in connection with the root and first inversion chords, but using the third chord section CH3 of scale 14. The note selector S" will be set at the note designation 33 or key 25 or 26 whose second inverted chords are to be located. The chords will be located by the pointers P-2, P-3, P4 in rows R2", R3", R4'. Advanced or enlarged second inverted chords are located by the 6th, 7th, MAJ. 7th, d9th, 9th pointers in section CH3.

The base 12 can be shifted toward the base or toward the treble ends of the keyboard to locate chords in lower or higher octaves respectively.

In FIGS. 1 and 3, the root position, first inversion and second inversion chord location sections CH1, CH2, CH3 are located all on one side of the slider 14. If a shorter chord finder is desired, the device 10a of FIGS. 4 and 5 can be constructed with base 12a having a lip or ledge 22a divided into chromatic divisions 33' extending about two octaves. The slide plate 14a may have the first section CH1 on one side S1 of the scale for locating root position chords. On the reverse side S2 will be sections CH2 and CH3 for locating first and second inversions of chords. The arrangement of note selectors S, S' and S" and all of pointers will be the same as described in connection with slide 14. The device will be used in the same way as device 10. It can be constructed out of a single rectangular blank-like blank B of FIG. 3, but may be about one half as long.

In FIGS. 6 and 7 is shown a chord finder device 10b which includes a base 12b made inexpensively out of metal or plastic by stamping or extrusion. The base has a vertical wall 16' from which extends laterally a ledge or lip 22'. A part 16" of wall 16 extends below lip 22' and this fits between abutments 40 behind the black keys 25 and back wall 42 of the keyboard. Under the lip 22' is a rubber pad 50 which is secured to the underside of the lip by a suitable adhesive. This pad serves to dampen any sound which might be made when the keys contact the underside of the base 12b after being depressed and released. The pad also serves to hold the base frictionally in place and prevents longitudinal movement of the base along the keyboard. A flange 52 extends along the top of lip 22' near wall 16' and another flange 54 extends along the top of wall 16'. This flange defines upper groove 20' with wall 16 and flange 52 defines a lower groove 20". In the opposing grooves 20', 20" is slidably engaged slide plate 14b. Knobs 58, 60 at opposite ends of plate 14b facilitate moving the plate longitudinally when the knobs are grasped. The layout of note selectors and pointers on the front face of the slide plate 14b is the same as on slide 14. The device 10b is used in the same way as described in connection with device 10, to locate chords in root positions, first and second inversions. Although the base 12b is shown about two octaves long, it could be three, four or more octaves in length to avoid having to move it for locating chords in higher and lower octaves.

The invention will be found useful to students, teachers, instrumentalists, and others desiring to acquire rapid familiarity with the note structure of most generally employed music chords in all tempered scales. The device is very inexpensive to manufacture, and is light in weight and easily portable. The devices 10 and 10a can be flattened out when not in use to occupy no more space than a single or double thickness of paper, and can be refolded and set up on a keyboard when again required for use.

While we have illustrated and described the preferred embodiments of our invention, it is to be understood that we do not limit ourselves to the precise constructions herein disclosed and that various changes and modifications may be made within the scope of the invention as defined in the appended claim.

What is claimed is:

A music chord finder device adapted for locating notes of chords on a music keyboard having a multiplicity of playable keys in side-by-side relationship with abutments formed on rear portions of the keys, and having a vertical panel spaced slightly from said abutments; comprising a base member made of folded, flexible sheet material, said base member having a wider imperforate rear wall and a narrower imperforate front wall, both walls being integrally joined at a bottom folded edge defining a groove with open top therebetween, said folded edge being insertable between said panel and said abutments, an imperforate lip integrally formed with the upper edge of the front wall and extending forwardly thereof the full length of said member for overlaying rear ends of the keys, said front wall having a width substantially equal to depths of said abutment so that the lip lies on and is supported by the keys, and a flat slide plate slidably disposed in said groove between said walls, said plate being removable from said groove and insertable into said groove through the open top thereof, said plate holding the walls apart to abut said panel and abutments respectively, said plate being movable along the base member while remaining in said groove, said slide plate having an upper portion extending above said lip to facilitate grasping the slide plate for removable and replacement of the same, said lip being divided into designated areas corresponding to respective keys of the keyboard, said upper portion of the slide plate having a plurality of chord location sections, a plurality of horizontal rows of differently colored pointers in each section, the pointers in a first one of the sections being spaced apart at distances corresponding to locations of notes of chord in root positions of keys designated on said lip, the pointers in a second one of said sections being spaced apart at distances corresponding to locations of notes of the first inversion of chords of the keys designated on said lip, the pointers in a third one of the sections being spaced apart at distances corresponding to locations of notes of the second inversion of chords of the keys designated on said lip, the pointers of the three chord location sections all being located on one side of the slide plate, the pointers in the three sections being arranged to locate notes in major, minor, augmented and diminished chords and enlargements of elementary chords.

References Cited

UNITED STATES PATENTS

| | | | |
|---|---|---|---|
| Re. 24,195 | 8/1956 | Wallace | 84—478 |
| 201,030 | 3/1878 | Mason | 84—481 |
| 257,790 | 5/1882 | Wagner | 84—480 |
| 741,017 | 10/1903 | Curtiss | 84—480 |
| 765,937 | 7/1904 | Reese | 84—480 |
| 777,793 | 12/1904 | Kruschke | 84—481 |
| 1,017,045 | 2/1912 | French et al. | 84—480 |
| 2,938,421 | 5/1960 | Leonard | 84—480 |
| 3,101,023 | 8/1963 | Weis | 84—482 |

FOREIGN PATENTS 3,556    2/1906    Great Britain.

RICHARD B. WILKINSON, *Primary Examiner.*

STEPHEN J. TOMSKY, C. M. OVERBEY, *Examiners.*